United States Patent
Einsweiler et al.

(10) Patent No.: US 7,979,232 B2
(45) Date of Patent: Jul. 12, 2011

(54) APPARATUSES AND METHODS FOR DETERMINING CONFIGURATION OF SAS AND SATA CABLES

(75) Inventors: Brian K. Einsweiler, Colorado Springs, CO (US); Luke E. McKay, Colorado Springs, CO (US); Steven F. Faulhaber, Bloomington, MN (US)

(73) Assignee: LSI Corporation, Milpitas, CA (US)

( * ) Notice: Subject to any disclaimer, the term of this patent is extended or adjusted under 35 U.S.C. 154(b) by 380 days.

(21) Appl. No.: 12/202,717

(22) Filed: Sep. 2, 2008

(65) Prior Publication Data

US 2010/0057393 A1     Mar. 4, 2010

(51) Int. Cl.
*G06F 19/00*     (2006.01)
*G01R 31/08*     (2006.01)

(52) U.S. Cl. ........................................ 702/108; 324/527

(58) Field of Classification Search .................. 702/108, 702/117; 324/158.1, 754, 527; 439/579, 439/620.01; 714/733, 736
See application file for complete search history.

(56) References Cited

U.S. PATENT DOCUMENTS

| | | | |
|---|---|---|---|
| 6,792,378 B2* | 9/2004 | Chen et al. ..................... | 702/119 |
| 7,595,646 B2* | 9/2009 | Hailey et al. .................. | 324/627 |
| 2006/0061369 A1* | 3/2006 | Marks et al. .................. | 324/542 |

* cited by examiner

*Primary Examiner* — Bryan Bui
(74) *Attorney, Agent, or Firm* — Duft Bornsen & Fishman LLP

(57) ABSTRACT

Apparatus, systems, and methods for testing SAS cables by applying a signal to one end of a SAS cable, receiving the signal from another end of the SAS cable, and generating an output of information relating to the testing. The testing apparatus may test one or more configuration characteristic of the SAS cable, including, for example a crossover status, a polarity status of transmit ("TX") wires, and a polarity status of receive ("RX") wires.

20 Claims, 6 Drawing Sheets

APPARATUSES AND METHODS FOR DETERMINING CONFIGURATION OF SAS AND SATA CABLES

BACKGROUND

1. Field of the Invention

The invention relates generally to Serially Attached Small Computer System Interface ("SAS") devices and more specifically relates to apparatus and methods to test a characteristic of a SAS cable.

2. Discussion of Related Art

It is generally known in the computing industry that a peripheral interface circuit is coupled with a processor to provide I/O interfacing to peripheral devices by the processor. One common peripheral interface utilized for coupling peripheral devices to a processor is the SAS interface. SAS comprises a family of standards for coupling high speed peripheral devices (including storage devices) to computing systems or processors. Many details of the SAS family of standards may be found at www.t10.org. For example, many present-day high performance disk drives utilize the SAS family of standards to permit high-speed exchange of information with the computing systems or processors through appropriate high speed SAS links.

A SAS cable supports one or more SAS links between ports of SAS devices. A single port SAS cable supports one SAS link between a port pair, and a wide port SAS cable supports multiple SAS links between multiple port pairs. For brevity, a group of wires of a SAS cable that support a SAS link will be referred to as a "port" of the SAS cable. Because a wide port SAS cable has multiple groups of wires that support multiple links, the wide port SAS cable may be referred to herein as having multiple "ports."

The SAS family of standards defines many different types of SAS cable connectors. Especially in a factory and/or laboratory environment, a wide port SAS cable can also have a wide variety of mappings from ports at one end of the wide port SAS cable to ports at another end. Given a particular port at one end of a SAS cable that couples to the particular port's respective port at another end of the SAS cable (i.e., the particular port "maps" to the respective port), there can also be many ways that wires of the particular port can be connected to wires of the respective port.

More specifically, a port of the SAS cable comprises a positive transmit ("TX+") wire, a negative transmit ("TX−") wire, a positive receive ("RX+") wire, and a negative receive ("RX−") wire. The transmit pair of the port at one end of the SAS cable can be connected to the transmit pair of the respective port at another end of the SAS cable. But the transmit pair at one end can also be connected to the receive pair at another end for a crossover port of the cable. The positive TX+ wire at one end can be connected to either the positive TX+ or RX+ wire at another end. But the positive TX+ wire at one end can also be connected to either the negative TX− or RX− wire at another end so that the polarity of the transmit wires is inverted. Similarly, the polarity of the receive wires can also be inverted independently of whether the polarity of the transmit wires is inverted or not.

As presently practiced, the wide variety of SAS cables are labeled and/or placed among like SAS cables in storage, and thus manually sorted and organized to define the cabling configuration. However, it has become very difficult to maintain an environment where many types of SAS cables are present because many SAS cables are labeled with insufficient information, labels may be removed, or the SAS cables may be misplaced in the wrong storage location. Meanwhile, many SAS cables are compatible with the Serial Advanced Technology Attachment ("SATA") standard, further complicating the variety of cables that are available.

Thus it is an ongoing challenge to reliably and readily determine configuration characteristic characteristics of SAS and SATA cables.

SUMMARY

The present invention solves the above and other problems, thereby advancing the state of the useful arts, by providing apparatus and methods for testing SAS cables by applying a signal to one end of a SAS cable, receiving the signal from another end of the SAS cable, and generating an output of information relating to the testing.

In one aspect hereof, an apparatus is provided to test a Serial Attached Small Computer System Interface ("SAS") cable. The apparatus comprises an output connector adapted to couple with a first end of the SAS cable, and an input connector adapted to couple with a second end of a SAS cable. The apparatus also comprises a testing element that is coupled with the input connector and the output connector. The testing element is adapted to test a characteristic of the SAS cable by applying a signal to the output connector and receiving the signal from the input connector. Additionally, the apparatus comprises an output generating element coupled with the testing element and adapted to generate an output of information relating to the tested characteristic.

Another aspect hereof provides a method for testing a Serial Attached Small Computer System Interface ("SAS") cable, the method comprises applying a signal to a first end of the SAS cable and receiving the signal from a second end of the SAS cable. The method also comprises testing a characteristic of the SAS cable based at least in part on the received signal. Additionally, the method comprises generating an output of information relating to the tested characteristic for a user.

Another aspect hereof provides a system for testing a Serial Attached Small Computer System Interface ("SAS") cable, the system comprises a host computer adapted to display a characteristic of the SAS cable to a user. The system also comprises an output connector adapted to couple with a first end of the SAS cable and an input connector adapted to couple with a second end of the SAS cable. The system further comprises a testing element that is coupled with the input connector and the output connector. The testing element is adapted to test a characteristic of the SAS cable by applying a signal to the output connector and receiving the signal from the input connector. Moreover, the system comprises an output generating element that is coupled with the testing element and the host computer. The output generating element is adapted to generate an output of information relating to the testing.

DETAILED DESCRIPTION OF THE DRAWINGS

Figure 1:
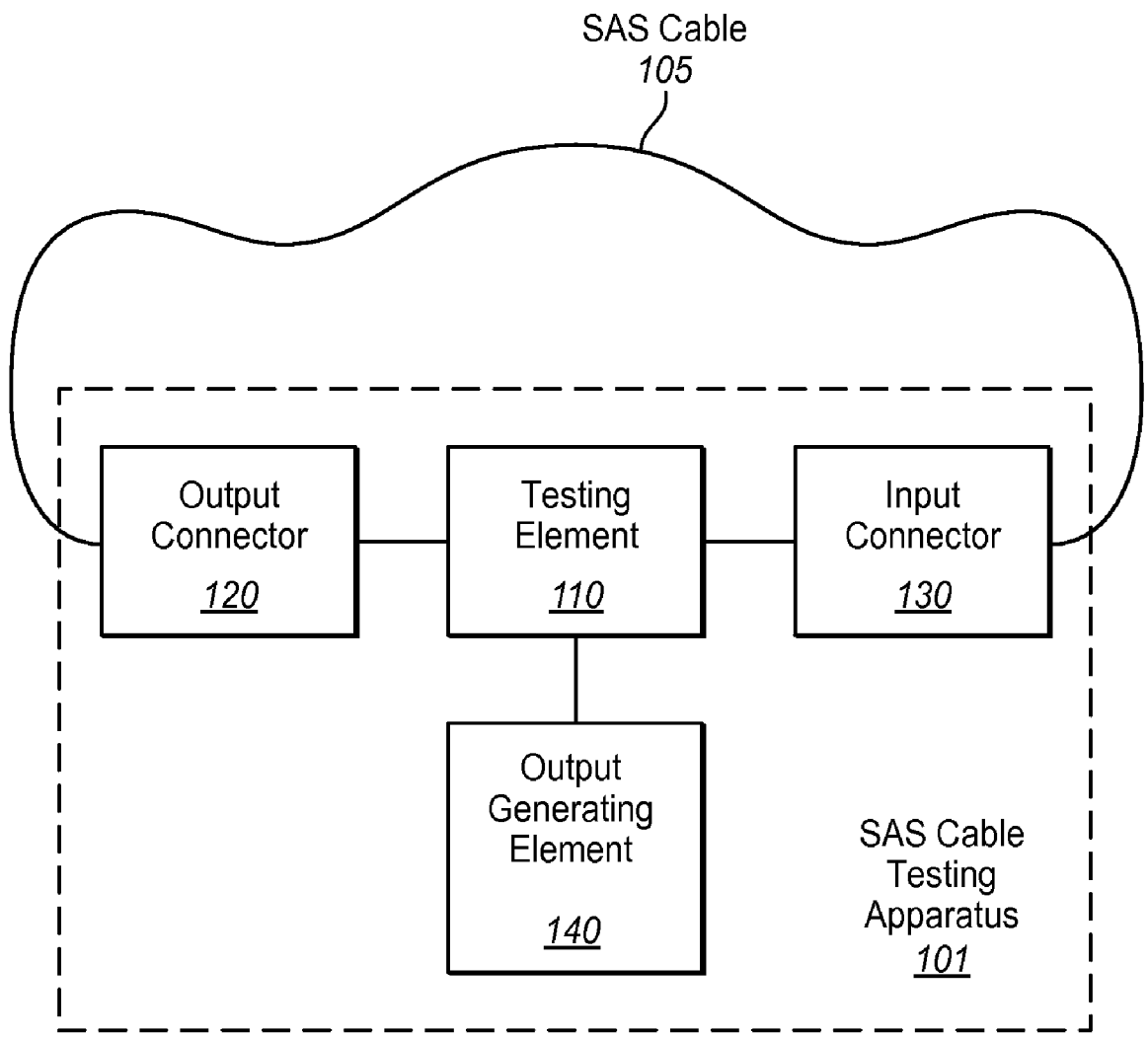
FIG. 1 is a block diagram of an exemplary SAS cable testing apparatus in accordance with features and aspects hereof.

FIG. 1 is a block diagram of an exemplary SAS cable testing apparatus 101 in accordance with features and aspects hereof. A testing element 110 is coupled with an output connector 120, an input connector 130, and an output generating element 140. The output connector 120 is adapted to couple with a first end of a SAS cable 105. The input connector 130 is adapted to couple with a second end of the SAS cable 105. Exemplary connector types for the output connector 120 and the input connector 130 comprise SFF-8470, SFF-8484, SFF-8087, SFF-8088, and SATA x4. The testing element 110 is adapted to test a characteristic of the SAS cable 105 by applying a signal to the output connector 120 and receiving the signal from the input connector 130. The testing element 110 includes a microcontroller or a general purpose processor executing instructions, and/or circuitry implemented in Field-Programmable Gate Array ("FPGA") or Application-Specific Integrated Circuit ("ASIC"), etc. The output generating element 140 is adapted to generate an output of information relating to the tested characteristic. As discussed further below, some of the tested characteristics comprise a crossover status of the SAS cable, whether the polarity of the transmit wires is inverted, and whether the polarity of the receive wires is inverted. Exemplary operation of the SAS cable testing apparatus 101 is discussed further herein below.

Figure 2:
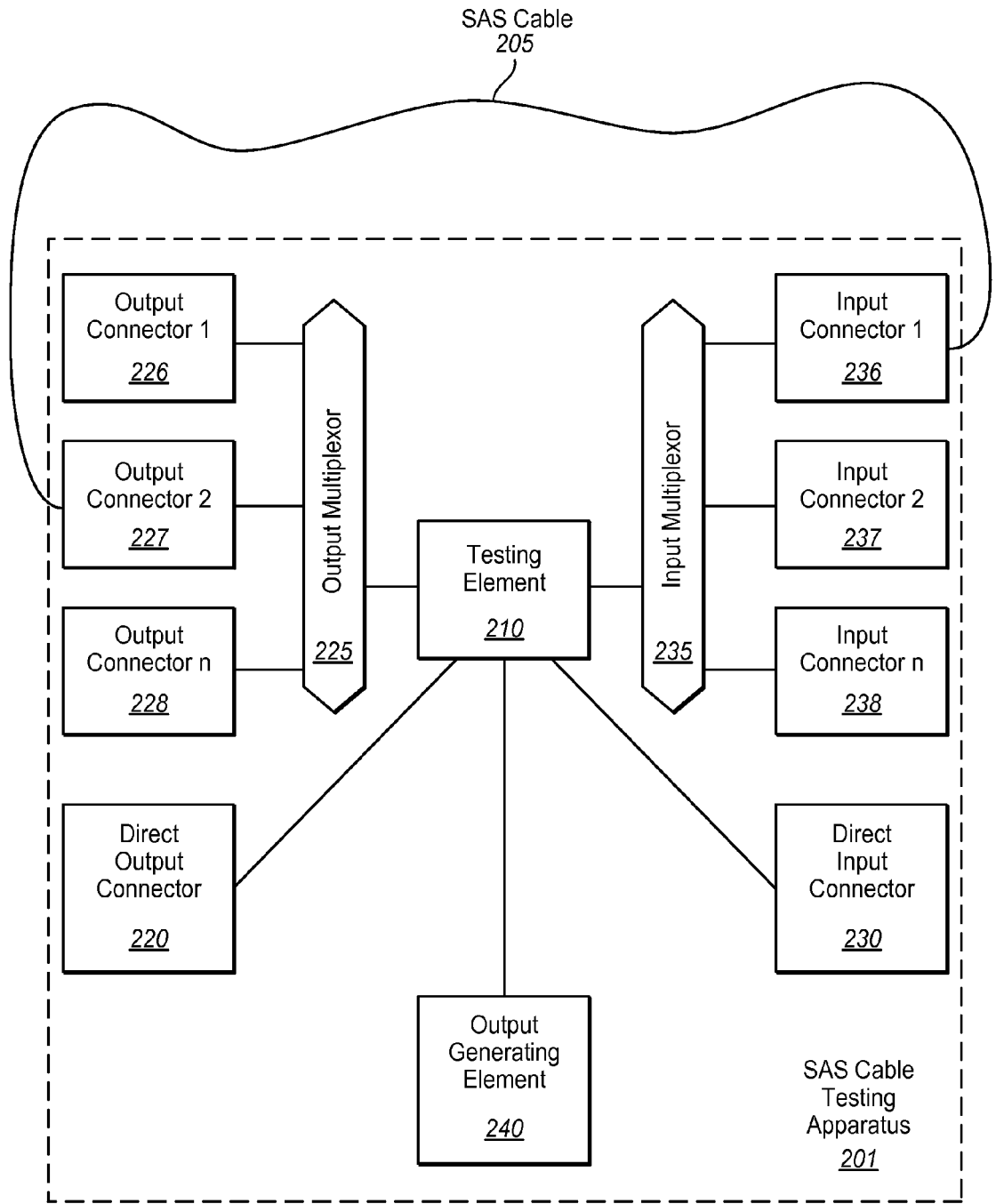
FIG. 2 is a block diagram of another exemplary SAS cable testing apparatus in accordance with features and aspects hereof.

FIG. 2 is a block diagram of an exemplary SAS cable testing apparatus 201 in accordance with features and aspects hereof. A testing element 210 is coupled with a direct output connector 220, a direct input connector 230, an output multiplexor 225, an input multiplexor 235, and an output generating element 240. The output multiplexor 225 is coupled with a plurality of output connectors 226, 227, and 228. The input multiplexor 235 is coupled with a plurality of input connectors 236, 237, and 238. The SAS family of standards defines many different types of connectors, and each of the output connectors 226, 227, and 228 and the input connectors 236, 237, and 238 may comprise a particular type of connector. For example, each connector may be any of various standard connectors for coupling to a single port of a SAS cable or for coupling to multiple ports of a wide port SAS cable. One end of a SAS cable 205 is coupled with one of the output connectors 226, 227, and 228 or the direct output connector 220, and the other end of the SAS cable 205 is coupled with one of the input connectors 236, 237, and 238 or the direct input connector 230.

The output multiplexor 225 is adapted for selecting one of the input connectors 226, 227, and 228 so that wires of the selected input connector can be in electrical connection with the testing element 210. Similarly, the input multiplexor 235 is adapted for selecting one of the input connectors 236, 237, and 238 so that wires of the selected input connector can be in electrical connection with the testing element 210. The particular connector to select may be based on user input and/or the testing element 210 may automatically select a connector by detecting one that is coupled with the SAS cable 205. In some instances, the output multiplexor 225 may be replaced by wiring similar wires of all output connectors 226, 227, and 228 together. Similarly, the input multiplexor 235 may also be replaced by wiring similar wires of all input connectors 236, 237, and 238 together. Because the multiplexors may cause signal interference when certain characteristics are tested, the direct output connector 220 and the direct input connector 230 are provided for more direct electrical connections with the testing element 210. The output generating element 240 is adapted to generate an output of information relating to the tested characteristic as discussed further below. Exemplary operation of the SAS cable testing apparatus 201 is also discussed further herein below.

Figure 3:
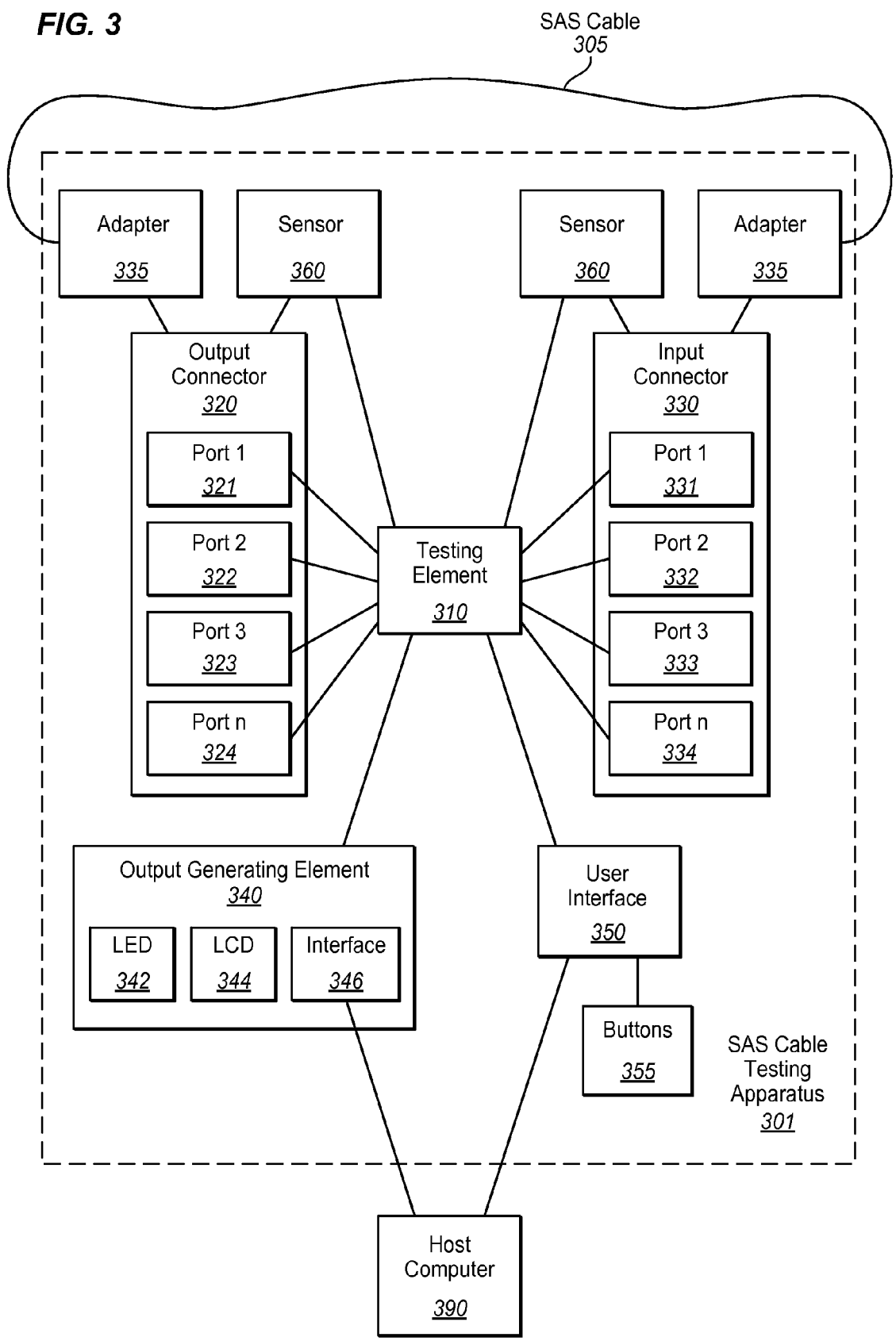
FIG. 3 is a block diagram of an exemplary SAS cable testing system in accordance with features and aspects hereof.

FIG. 3 is a block diagram providing an exemplary SAS cable testing system comprising a host computer 390 and a SAS cable testing apparatus 301. A testing element 310 is coupled with an output connector 320, an input connector 330, an output generating element 340, a user interface 350, and one or more sensors 360. The output connector 320 is adapted to couple with a first end of a SAS cable 305. The input connector 330 is adapted to couple with a second end of the SAS cable 305. Exemplary connector types for the output connector 320 and the input connector 330 comprise SFF-8470, SFF-8484, SFF-8087, SFF-8088, and SATA x4. Additionally, an adapter 335 can be used for coupling the SAS cable 305 with at least one of the output connector 320 and the input connector 330. The adapter 335 adapts a connector type of one end of the SAS cable 305 to a connector type of at least one of the output connector 320 and the input connector 330. Moreover, the output connector 320 comprises a wide port SAS connection having multiple ports 321, 322, 323, and 324 that are coupled with the testing element 310. Likewise, the input connector 330 comprise a wide port SAS connection having multiple ports 331, 332, 333, and 334 that are coupled with the testing element 310.

The output generating element 340 is adapted to generate an output of information relating to a characteristic tested by the testing element 310. The output generating element 340 may comprise at least one of a light emitting diode ("LED") 342 and/or a liquid crystal display ("LCD") 344 for presenting the information. Because the SAS cable 305 can comprise multiple ports, a set of LEDs may be used to present the information for each port. For example, an LED of the set of LEDs for a given port may indicate a valid SAS configuration, a crossover status, whether the polarity of transmit wires is inverted, or whether the polarity of receive wires is inverted, etc. Alternatively, a single LED may be used to indicate a particular type of port configuration for each port, and a single LED may also be used to indicate a particular type of SAS cable. For example, the output generating element 340 may flash or blink a single LED to indicate particular information based on frequency counts, or duration of the flashes.

Similarly, an LCD 344 may be used to present information for each port and/or to present information for all ports of the SAS cable 305. The LCD 344 may also indicate a particular type of SAS cable 305. The output generating element 340 may also comprise an interface 346 for outputting the information to the host computer 390. The interface 346 may comprise Universal Serial Bus ("USB"), Ethernet, Firewire, and/or wireless interfaces, etc. Through the interface 346, information similar to those discussed above with regard to the LED 342 and the LCD 344 may be transmitted to the host computer 390 and presented to a user.

The user interface 350 is coupled with the testing element 310, the host computer 390, and a set of buttons 355. The testing element 310 may be adapted to begin testing the SAS cable 305 in response to a user input received through the user interface 350. The testing element 310 may be further adapted to begin testing for a particular type of cable in response to a user input selecting the particular type of cable received through the user interface 350. For example, the user input may be a button press on the set of buttons 355 and/or an entry through the host computer 390 by using a mouse or a keyboard, etc.

The one or more sensors 360 are coupled with the testing element 310 and adapted to sense when at least one of the output connector 320 and the input connector 330 is coupled with the SAS cable 305. Accordingly, the one or more sensors 360 may also be optically, mechanically, and/or electrically coupled with the output connector 320 and/or the input connector 330. The testing element 310 may be further adapted to begin testing the SAS cable 305 automatically when the one or more sensors 360 sense at least one of the output connector 320 and the input connector 330 is coupled with the SAS cable 305.

Additionally, the testing element 310 may be adapted to detect a presence of the SAS cable 305 by repeatedly applying a signal to the output connector 320 and attempting to receive the signal from the input connector 330. After the presence of the SAS cable 305 is detected, the testing element 310 is adapted to test additional characteristics of the SAS cable 305. A user may also be allowed to select when testing should begin based on one or more of the above techniques.

The testing element 310 is adapted to test a characteristic of the SAS cable 305 by applying a signal to the output connector 320 and receiving the signal from the input connector 330. The testing element 310 includes a microcontroller or a general purpose processor executing instructions, and/or circuitry implemented in Field-Programmable Gate Array ("FPGA") or Application-Specific Integrated Circuit ("ASIC"), etc. The testing element 310 is further adapted to determine a mapping from a port of the output connector 320 to a port of the input connector 330 when testing a wide port SAS cable. For example, a port 321 of the output connector 320 may be mapped to any of the ports 331, 332, 333, and 334 of the input connector 330. Given a particular output port to input port mapping, the testing element 310 is adapted to test a characteristic by applying a signal to an output port and receiving the signal from the output port's respective input port to which the output port is mapped.

The testing element 310 is further adapted to check whether the SAS cable 305 has a valid SAS configuration. For example, the signal that is applied to the output connector 320 may not be received at the input connector 330, indicating a broken connection. As another example, the signal that is applied to the output connector 320 may be received on multiple wires at the input connector 330, indicating a shorted connection. The testing element 310 is also adapted to check a crossover status of the SAS cable, whether the polarity of the transmit wires is inverted, and whether the polarity of the receive wires is inverted. The testing element 310 is further adapted to measure a quality parameter of the SAS cable 305 by applying a pulsed signal to at least one of the input connector and the output connector and by receiving at least one of the pulsed signal and a reflected signal. The quality parameter of the SAS cable is measured based at least in part on at least one received signal. Those skilled in the art will recognize that the testing element 310 is being further adapted to perform functions similar to a time-domain reflectometer ("TDR") or a vector network analyzer ("VNA"), but other techniques to measure a quality parameter of the SAS cable 305 may also be used. Exemplary operation of the SAS cable testing apparatus 301 is also discussed further herein below.

Figure 4:
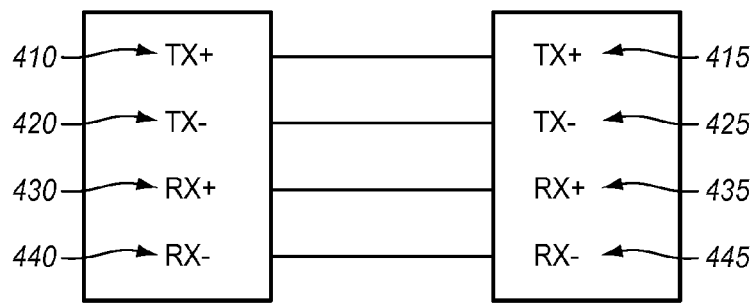
FIGS. 4-7 illustrates exemplary characteristics of SAS cables that are tested in accordance with features and aspects hereof.

FIG. 4 illustrates an exemplary characteristic of a SAS cable that the testing element 310 of FIG. 3 is adapted to test. A signal that is applied to the positive transmit ("TX+") wire 410 is received at the positive transmit ("TX+") wire 415. A signal that is applied to the negative transmit ("TX−") wire 420 is received at the negative transmit ("TX−") wire 425. A signal that is applied to the positive receive ("RX+") wire 430 is received at the positive receive ("RX+") wire 435. A signal that is applied to the negative receive ("RX−") wire 440 is received at the negative receive ("RX−") wire 445. Because the transmit pair of wires 410 and 420 of the port at one end of the SAS cable are connected to the transmit pair of wires 415 and 425 of the port at another end of the SAS cable, the port of the SAS cable is not a crossover port. Additionally, because the positive transmit ("TX+") wire 410 of the port at one end of the SAS cable is connected to the positive transmit or receive wire of the port at another end of the SAS cable, the polarity of the transmit wires of the port is not inverted. Because the positive receive ("RX+") wire 430 of the port at one end of the SAS cable is connected to the positive transmit or receive wire of the port at another end of the SAS cable, the polarity of the receive wires of the port is also not inverted.

Figure 5:
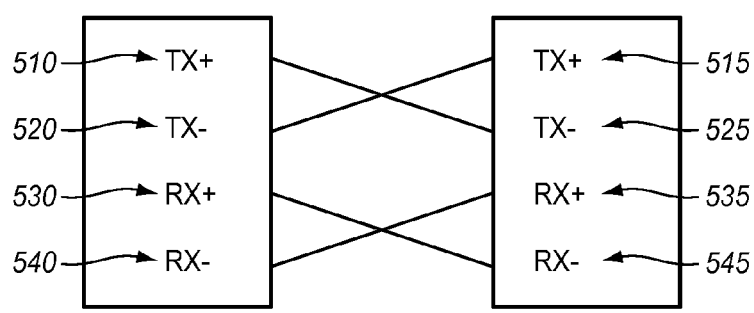

FIG. 5 illustrates another exemplary characteristic of a SAS cable that the testing element 310 of FIG. 3 is adapted to test. A signal that is applied to the positive transmit ("TX+") wire 510 is received at the negative transmit ("TX−") wire 525. A signal that is applied to the negative transmit ("TX−") wire 520 is received at the positive transmit ("TX+") wire 515. A signal that is applied to the positive receive ("RX+") wire 530 is received at the negative receive ("RX−") wire 545. A signal that is applied to the negative receive ("RX−") wire 540 is received at the positive receive ("RX+") wire 535. Because the transmit pair of wires 510 and 520 of the port at one end of the SAS cable are connected to the transmit pair of wires 515 and 525 of the port at another end of the SAS cable, the port of the SAS cable is not a crossover port. Additionally, because the positive transmit ("TX+") wire 510 of the port at one end of the SAS cable is connected to the negative transmit or receive wire of the port at another end of the SAS cable, the polarity of the transmit wires of the port is inverted. Because the positive receive ("RX+") wire 530 of the port at one end of the SAS cable is connected to the negative transmit or receive wire of the port at another end of the SAS cable, the polarity of the receive wires of the port is also inverted. However, it will be understood that the polarity of the receive wires is independent of the polarity of the transmit wires.

Figure 6:
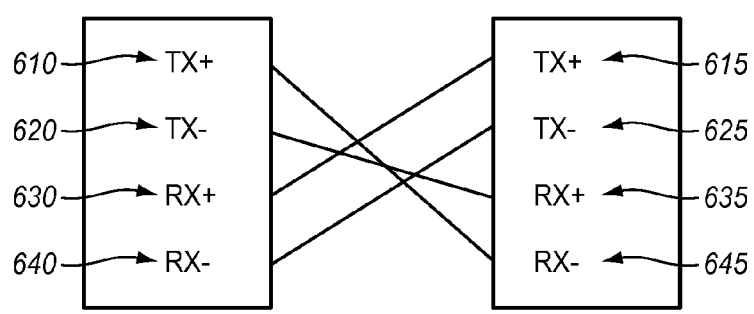

FIG. 6 illustrates yet another exemplary characteristic of a SAS cable that the testing element 310 of FIG. 3 is adapted to test. A signal that is applied to the positive transmit ("TX+") wire 610 is received at the negative receive ("RX−") wire 645. A signal that is applied to the negative transmit ("TX−") wire 620 is received at the positive receive ("RX+") wire 635. A signal that is applied to the positive receive ("RX+") wire 630 is received at the positive transmit ("TX+") wire 615. A signal that is applied to the negative receive ("RX−") wire 640 is received at the negative transmit ("TX−") wire 625. Because the transmit pair of wires 610 and 620 of the port at one end of the SAS cable are connected to the receive pair of wires 635 and 645 of the port at another end of the SAS cable, the port of the SAS cable is a crossover port. Additionally, because the positive transmit ("TX+") wire 610 of the port at one end of the SAS cable is connected to the negative transmit or receive wire of the port at another end of the SAS cable, the polarity of the transmit wires of the port is inverted. Because the positive receive ("RX+") wire 630 of the port at one end of the SAS cable is connected to the positive transmit or receive wire of the port at another end of the SAS cable, the polarity of the receive wires of the port is not inverted.

Figure 7:
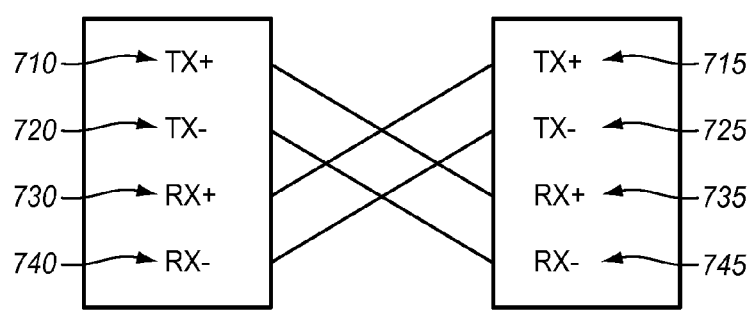

FIG. 7 illustrates another exemplary characteristic of a SAS cable that the testing element 310 of FIG. 3 is adapted to test. A signal that is applied to the positive transmit ("TX+") wire 710 is received at the positive receive ("RX+") wire 735.

A signal that is applied to the negative transmit ("TX−") wire 720 is received at the negative receive ("RX−") wire 745. A signal that is applied to the positive receive ("RX+") wire 730 is received at the positive transmit ("TX+") wire 715. A signal that is applied to the negative receive ("RX−") wire 740 is received at the negative transmit ("TX−") wire 725. Because the transmit pair of wires 710 and 720 of the port at one end of the SAS cable are connected to the receive pair of wires 735 and 745 of the port at another end of the SAS cable, the port of the SAS cable is a crossover port. Additionally, because the positive transmit ("TX+") wire 710 of the port at one end of the SAS cable is connected to the positive transmit or receive wire of the port at another end of the SAS cable, the polarity of the transmit wires of the port is not inverted. Because the positive receive ("RX+") wire 730 of the port at one end of the SAS cable is connected to the positive transmit or receive wire of the port at another end of the SAS cable, the polarity of the receive wires of the port is not inverted.

Those of ordinary skill in the art will readily recognize numerous additional and equivalent components and modules within a fully functional SAS cable testing apparatus. Such additional and equivalent components are omitted herein for simplicity and brevity of this discussion. Thus, the structures of FIGS. 1, 2, and 3 are intended merely as representatives of exemplary embodiments of features and aspects hereof to provide apparatus and systems for testing a characteristic of a SAS cable, thereby determining configuration of SAS and SATA cables.

Figure 8:
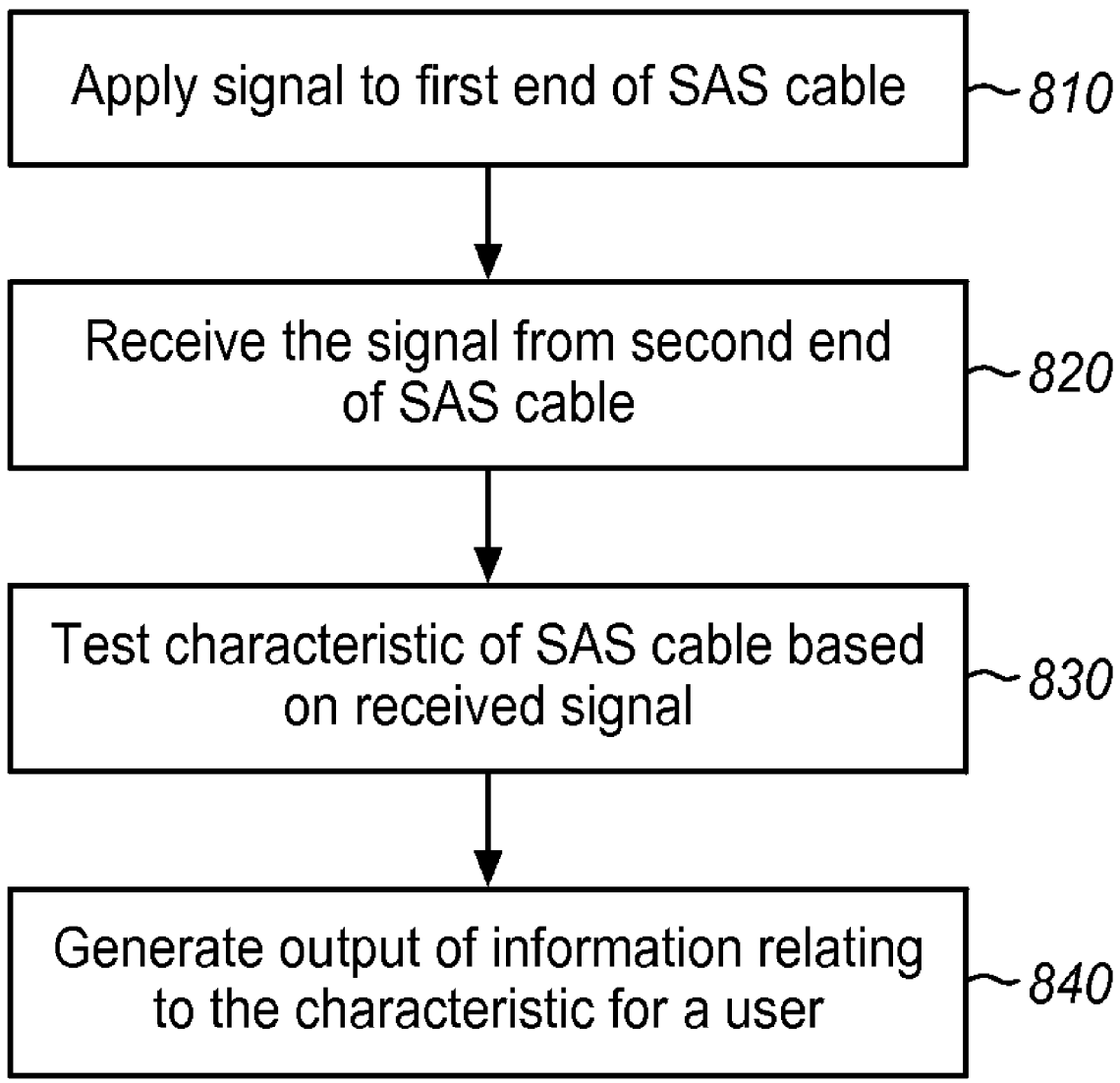
FIG. 8 is a flowchart describing an exemplary method in accordance with features and aspects hereof to test a SAS cable.

FIG. 8 is a flowchart describing an exemplary method in accordance with features and aspects hereof to test a SAS cable. The method to test the SAS cable may be initiated in response to sensing that a SAS cable is attached or in response to user input requesting start of the test, etc. The method starts at step 810 to apply a signal to a first end of a SAS cable. Step 820 receives the signal from a second end of the SAS cable. Step 830 tests a characteristic of the SAS cable based at least in part on the received signal, and step 840 generates an output of information relating to the tested characteristic for a user.

Figure 9:
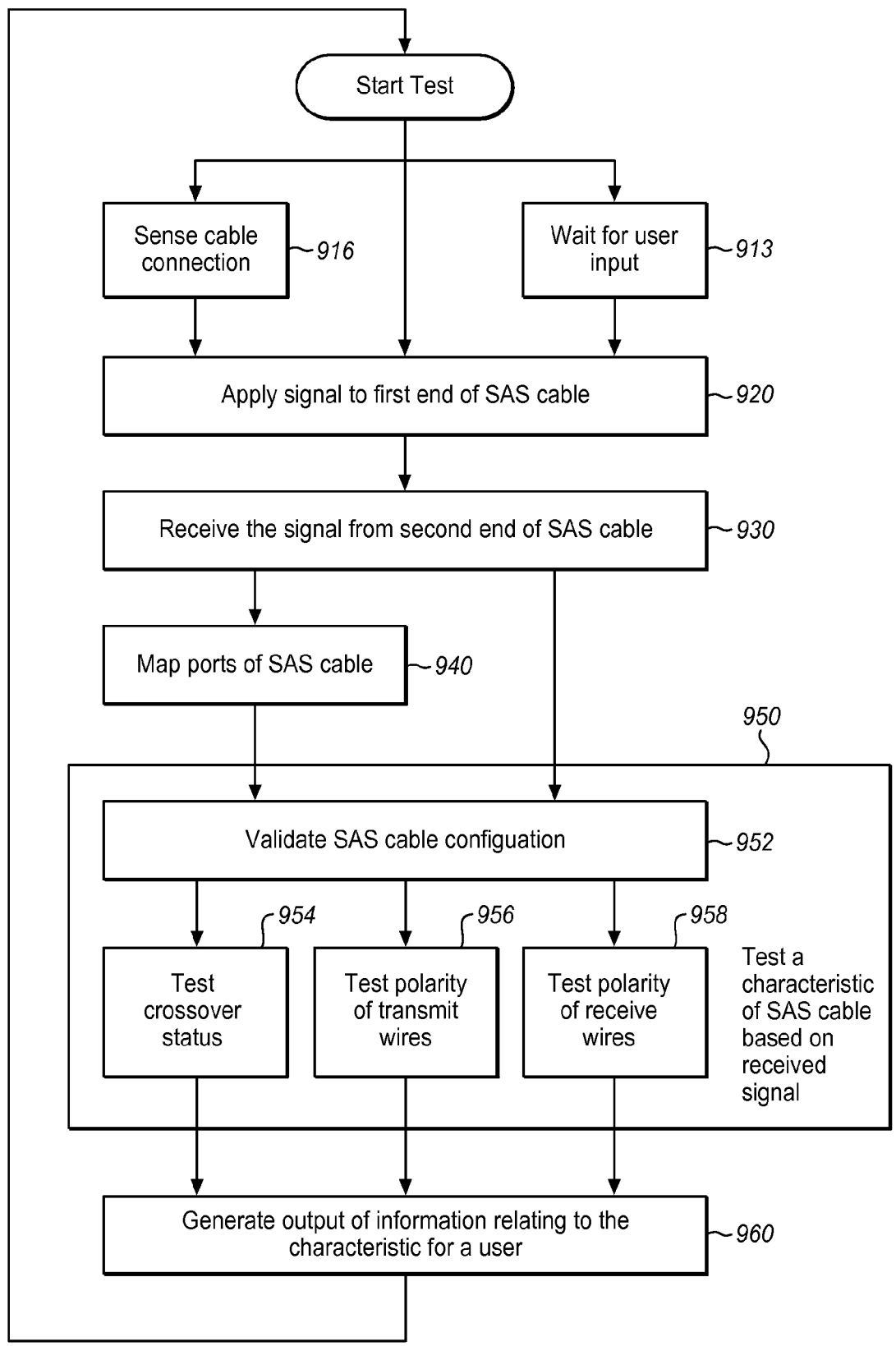
FIG. 9 is a flowchart describing another exemplary method in accordance with features and aspects hereof to test a SAS cable.

FIG. 9 is a flowchart describing another exemplary method in accordance with features and aspects hereof to test a SAS cable. The method starts at step 910 for selecting a way to begin testing a SAS cable. Step 913 waits for user input including a button press and/or an entry through a host computer. Step 916 senses whether a SAS cable has been connected. Alternatively and/or in addition, the method may simply proceed to step 920 by applying a signal to a first end of the SAS cable and attempting to receive the signal from another end of the SAS cable. More specifically, step 920 applies a signal to each wire at a first end of the SAS cable. For example, if the SAS cable comprises four ports (i.e., the SAS cable is a wide port SAS cable), a signal would be applied sixteen times because each port has four wires. When the signal is applied to a wire at the first end of the SAS cable, each of the wires at the second end of the SAS cable is checked to receive the signal at step 930. For example, if the SAS cable has four ports, wires at the second end of the SAS cable would be checked 256 times. However, it will be understood that a connection status of the multiple wires may be tested in parallel by applying different signals to different wires.

If the SAS cable has multiple ports (i.e., the SAS cable is a wide port SAS cable), step 940 maps a first port of the first end of the SAS cable to a second port of the second end of the SAS cable. For example, signals applied to wires of port three of the four ports of the first end of the SAS cable at step 920 may all be received from wires of port two of the four ports of the second end of the SAS cable at step 930. Accordingly, step 940 would determine that port three maps to port two. Step 940 may also find that wires of a port may be mapped to multiple ports, indicating an invalid SAS cable configuration. If the SAS cable has a single port, the method bypasses step 940 and proceeds to step 950 to test one or more characteristics of a SAS cable.

Step 950 comprises a number of steps 952, 954, 956, and 958 for testing one or more characteristics. Step 952 makes additional validation of the SAS cable including whether wires may be shorted and/or broken. However, it will be understood that the actual check may also be performed while signals are received at step 930. For example, an array in memory may be used to keep track of received signals, such that an element of the array is increment (or assigned) when a signal is received at the element's respective wire. If an element of the array is incremented a second time (or assigned again), wires are shorted. If multiple elements of the array are incremented when the signal is applied to one wire, wires are also shorted. If no element of the array is incremented, the wire is broken.

If the SAS cable has a valid configuration, one or more characteristic of the SAS cable is then tested by checking a connection status of wires of each port by repeating steps 954, 956, and 950 for each port. Step 954 tests a crossover status of a port by checking whether the transmit pair of wires of a port at one end of the SAS cable are connected to the transmit pair of wires of the port at another end of the SAS cable. If so, the port is not a crossover port; otherwise, the port is a crossover port. Step 956 tests a polarity status of transmit wires of the port by checking whether the positive transmit ("TX+") wire of the port at one end of the SAS cable is connected to the positive transmit or receive wire of the port at another end of the SAS cable. If so, the polarity of the transmit wires of the port is not inverted; otherwise the polarity of the transmit wires of the port is inverted. Step 958 tests a polarity status of transmit wires of the port by checking whether the positive receive ("RX+") wire of the port at one end of the SAS cable is connected to the positive transmit or receive wire of the port at another end of the SAS cable. If so, the polarity of the receive wires of the port is not inverted; otherwise the polarity of the receive wires of the port is inverted.

Step 960 generates an output of information relating to the one or more characteristics of the SAS cable that have been tested. For example, the information may be presented on an LED, LCD, or transmitted to a host computer through an interface for a user. The method then loops back to step 910 for performing another test.

Those of ordinary skill in the art will readily recognize numerous additional and equivalent steps that may be performed and/or omitted in the methods of FIGS. 8 and 9. Such additional and equivalent steps are omitted herein merely for brevity and simplicity of this discussion.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A Serial Attached Small Computer System Interface ("SAS") cable testing apparatus, the apparatus comprising:
 an output connector adapted to couple with a first end of a SAS cable;
 an input connector adapted to couple with a second end of the SAS cable;
 a testing element, coupled with the input connector and the output connector, adapted to test a characteristic of the SAS cable by applying a signal to the output connector and receiving the signal from the input connector; and
 an output generating element coupled with the testing element and adapted to generate an output of information relating to the tested characteristic.

2. The SAS cable testing apparatus of claim 1, wherein the input connector has a connector type selected from one of SFF-8470, SFF-8484, SFF-8087, SFF-8088, and SATA x4, and the output connector has a connector type selected from one of SFF-8470, SFF-8484, SFF-8087, SFF-8088, and SATA x4.

3. The SAS cable testing apparatus of claim 1, wherein the testing element is adapted to check the characteristic comprising at least one of:
 whether the SAS cable has a valid SAS configuration,
 a crossover status of the SAS cable,
 a polarity status of transmit ("TX") wires of the SAS cable, and
 a polarity status of receive ("RX") wires of the SAS cable.

4. The SAS cable testing apparatus of claim 1, wherein the output generating element comprises at least one of a light emitting diode ("LED") or a liquid crystal display ("LCD") for presenting the information.

5. The SAS cable testing apparatus of claim 1, wherein the information indicates a particular type of the SAS cable.

6. The SAS cable testing apparatus of claim 1, wherein the output generating element further comprises an interface for coupling with a host computer for outputting the information to the host computer.

7. The SAS cable testing apparatus of claim 1, wherein the testing element is further adapted to detect a presence of the SAS cable by repeatedly applying the signal to the output connector and attempting to receive the signal from the input connector.

8. The SAS cable testing apparatus of claim 1, further comprising a sensor coupled with the testing element and adapted to sense when at least one of the input connector and the output connector is connected to the SAS cable.

9. The SAS cable testing apparatus of claim 1, further comprising a user interface coupled with the testing element, wherein the testing element is further adapted to begin testing the SAS cable in response to a user input received through the user interface.

10. The SAS cable testing apparatus of claim 1, further comprising a user interface coupled with the testing element, wherein the testing element is further adapted to begin testing for a particular type of cable in response to a user input selecting the particular type of cable received through the user interface.

11. The SAS cable testing apparatus of claim 1, further comprising an adapter for coupling the SAS cable to at least one of the input connector and the output connector, wherein the adapter adapts a connector type of one end of the SAS cable to a connector type of the at least one of the input connector and the output connector.

12. The SAS cable testing apparatus of claim 1, wherein the input connector comprises a plurality of input connectors, and the SAS cable testing apparatus further comprises an input multiplexor for selecting one of the plurality of input connectors for coupling with the testing element; and
 wherein the output connector comprises a plurality of output connectors, and the SAS cable testing apparatus further comprises an output multiplexor for selecting one of the plurality of output connectors for coupling with the testing element.

13. The SAS cable testing apparatus of claim 1, wherein the testing element is further adapted to measure a quality parameter of the SAS cable by applying a pulsed signal to at least one of the input connector and the output connector and by receiving at least one of a reflected signal and the pulsed signal, wherein the quality parameter of the SAS cable is measured based at least in part on at least one received signal.

14. The SAS cable testing apparatus of claim 1, wherein:
 the input connector and the output connector comprise a wide port SAS connector having a plurality of ports;
 the testing element is further adapted to determine a mapping from a port of the output connector to a port of the input connector; and
 the testing element is further adapted to test the characteristic between the port of the output connector and the port of the input connector.

15. A method for testing a Serial Attached Small Computer System Interface ("SAS") cable, the method comprising:
 applying a signal to a first end of the SAS cable;
 receiving the signal from a second end of the SAS cable;
 testing a characteristic of the SAS cable based at least in part on the received signal; and
 generating an output of information relating to the tested characteristic for a user.

16. The method of claim 15, wherein the characteristic comprises at least one of:
 whether the SAS cable has a valid SAS configuration,
 a crossover status of the SAS cable,
 a polarity status of transmit ("TX") wires of the SAS cable, and
 a polarity status of receive ("RX") wires of the SAS cable.

17. The method of claim 15, further comprising presenting the information on at least one of a light emitting diode ("LED") or a liquid crystal display ("LCD").

18. The method of claim 15, wherein the step of applying comprises applying a pulsed signal to at least one of the input connector and the output connector, and wherein the step of receiving comprises receiving at least one of a reflected signal and the pulsed signal for measuring a quality parameter of the SAS cable based at least in part on at least one received signal.

19. The method of claim 15, wherein the SAS cable comprises a wide port SAS cable having a plurality of ports; the method further comprising:
 mapping a first port of the first end of the SAS cable to a second port of the second end of the SAS cable; and
 testing a characteristic of the SAS cable between the first port and the second port.

20. A system for testing a Serial Attached Small Computer System Interface ("SAS") cable, the system comprising:
- a host computer adapted to display a characteristic of the SAS cable to a user;
- an output connector adapted to couple with a first end of the SAS cable;
- an input connector adapted to couple with a second end of the SAS cable;
- a testing element, coupled with the input connector and the output connector, adapted to test a characteristic of the SAS cable by applying a signal to the output connector and receiving the signal from the input connector; and
- an output generating element, coupled with the testing element and the host computer, adapted to generate an output of information relating to the testing.

* * * * *